June 7, 1960

A. SMITH ET AL 2,939,721

SPRING SUSPENSION OF VEHICLE BODY FRAME

Filed May 31, 1957

2 Sheets-Sheet 1

INVENTORS
ALEXANDER SMITH
B. D. BAGGS, JR.

BY *H. Yates Dowell*

ATTORNEY

June 7, 1960  A. SMITH ET AL  2,939,721
SPRING SUSPENSION OF VEHICLE BODY FRAME
Filed May 31, 1957  2 Sheets-Sheet 2

INVENTORS
ALEXANDER SMITH
B. D. BAGGS, JR.
BY *A. Yates Dowell*
ATTORNEY

United States Patent Office 2,939,721
Patented June 7, 1960

2,939,721

SPRING SUSPENSION OF VEHICLE BODY FRAME

Alexander Smith, P.O. Box 1460, and Burton D. Baggs, Jr., 2429 Laurel Ave., both of Sanford, Fla.

Filed May 31, 1957, Ser. No. 662,945

1 Claim. (Cl. 280—106.5)

This invention relates to the handling, transportation and storage of commodities and to equipment employed in such operations including relatively small trucks, carts, wheelbarrows and other vehicles used to a great degree where volume and weight of the material handled is large.

The invention relates particularly to equipment employed in moving commodities short distances including in stores, warehouses and other buildings and out of doors wherever it is desired to move material and packages or the like easily and quickly with minimum expenditure of time and effort.

In the moving of material of various kinds including earth in various forms and in combination with various materials such as cement, fertilizer, feeds of various kinds, other raw and finished products with which man comes in contact daily, various types of labor saving devices have been employed including carts, wheelbarrows, wagons and other vehicles. These devices have been complicated, expensive and impractical and required skill in their use.

It is an object of the invention to provide a spring frame for a relatively simple, inexpensive, three-wheeled vehicle with an air-cooled power plant and front-wheel drive as well as a vehicle in which the power plant need only be of small horsepower carried on the front wheel and the front wheel is so mounted that it can turn almost 180° either to the right or to the left, eliminating the necessity for complicated transmission with reverse gearing.

Figure 1:
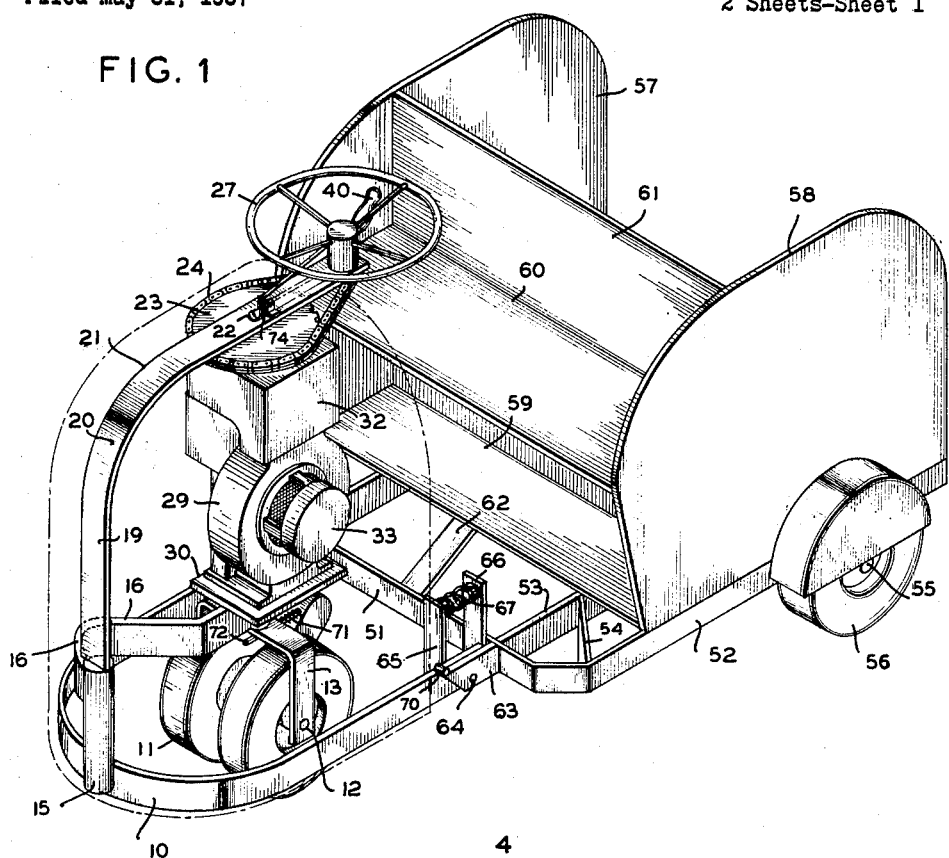
Figure 2:
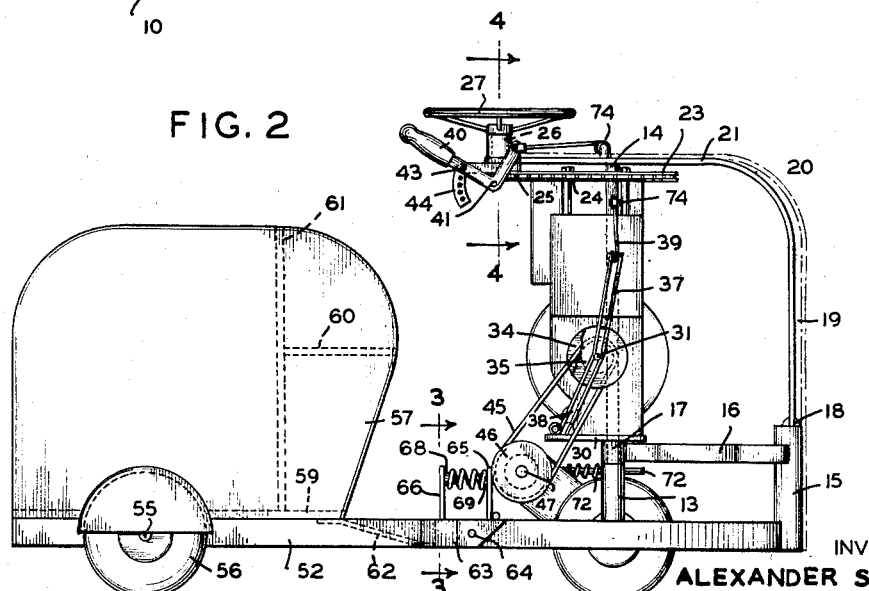
Figure 3:
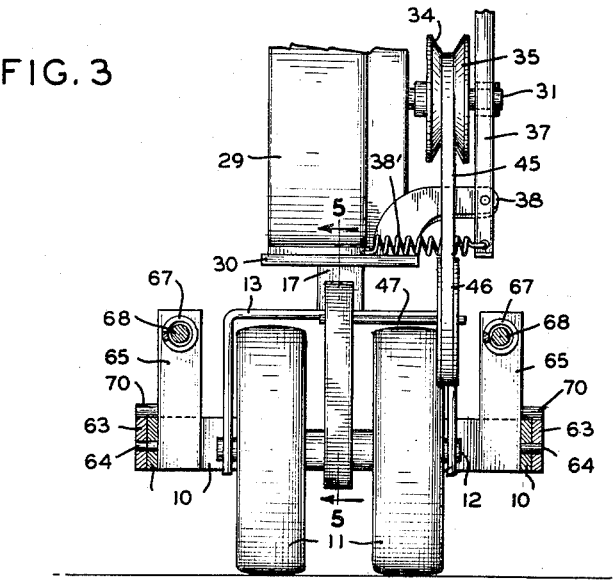
Figure 4:
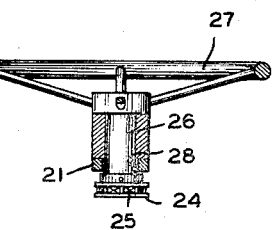

Other objects and advantages of the invention will be apparent from the following description taken in conjunction with the accompanying drawing wherein:

Fig. 1 is a perspective illustrating one application of the invention;

Fig. 2, a side elevation from the opposite side of Fig. 1;

Fig. 3, an enlarged section on the line 3—3 of Fig. 2;

Fig. 4, an enlarged section on the line 4—4 of Fig. 2; and

Figure 5:
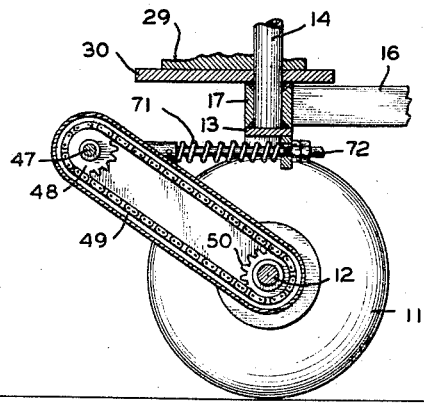

Fig. 5, a section on the line 5—5 of Fig. 3.

Briefly stated, the present invention is a small relatively simple inexpensive highly maneuverable vehicle comprising a steering unit and a load and operator sustaining unit pivotally connected and with a pair of upstanding laterally disposed abutments at each side incorporating compression springs therebetween for absorbing shock. The driving and steering unit comprises a post and a wheel embracing yoke. A power plant is disposed about the post and belt and chain transmission extends therefrom to a dual driving wheel located within the yoke beneath the post. The post and yoke are mounted in a pair of brackets attached to the front of the frame of the machine. A steering wheel is provided at the top of the post by which the post may be rotated to control the direction of movement of the vehicle either forwardly or rearwardly.

The load and operator sustaining unit includes a frame supported by conventional wheels and a body having a floor and an upright partition with a seat on the forward side of the latter in order to support an operator in convenient position relative to the steering wheel.

With continued reference to the drawings, the vehicle of the present invention comprises a combination driving and steering unit and a load and operator supporting unit. The first of these units comprises a substantially U-shaped frame or chassis 10 within and above which are disposed a dual steerable wheel 11 on an axle 12 carried by yoke 13. The yoke is connected at its center to an upright hollow shaft or post 14 in which is housed the motor controls.

The frame 10 is provided at its front center with a hollow supporting post 15 having a bracket 16 extending from its right side and curved rearwardly and terminating in a hub or bearing 17 which encircles the shaft 14. To the top of the post 15 is secured by welding 18 or other means the lower end of an upstanding bracket 19 having a curved intermediate portion 20 and a horizontal portion 21 disposed substantially at right angles to the upright portion 19. The horizontal portion 21 has an opening 22 forming a bearing for the shaft 14.

Thus the dual wheel structure is mounted similarly to the front wheel of a bicycle upon a substantially vertical post which permits turning of the wheel substantially a half turn either to the right or the left, thus eliminating the necessity for a complicated transmission with reverse gearing and associated mechanism.

In order to determine the angular position of the dual wheel 11 or in order to steer the vehicle the post 14 has fixed thereto adjacent its upper end a sprocket 23 on which is mounted a chain 24 which extends around a smaller sprocket 25 fixed on a steering column 26 to which is fixed a steering device such as for example a steering wheel 27. The steering column 26 extends through an opening 28 in the horizontal portion 21 in rearwardly spaced relation from the post 14. Thus, rotation of the steering wheel will cause rotation of the post 14.

In order to drive the dual wheel 11 a 1½ hp. or other capacity motor or internal combustion engine 29 is mounted about the hollow shaft 14 on a platform or support 30 which rotatably rests upon the bearing 17 on the inner end of the bracket 16. The motor includes a shaft 31, a fuel tank 32, and a starter 33.

On the shaft 31 at the right hand side of the machine is mounted a variable drive mechanism including a split pulley or sheave having a fixed section 34 and a movable section 35 rotatably and pivotally connected to an operating lever 37 so that such movable portion can be adjusted relative to the fixed portion and such pulley thereby can have its diameter varied and consequently control the speed of the vehicle.

The lever 37 is pivoted to an anchoring lug 38 attached to the motor, the lower end being connected to a tension spring 38', and the other end of the lever is connected by a flexible cable 39 with a bellcrank operating lever 40 mounted on a pivot 41 attached to a lug depending from the end portion of the bar 21. In order to hold the lever 40 in a definite position against tension of spring 38' it is provided with a detent 43 constructed to enter a series of spaced openings on arcuate bracket 44.

The split pulley is employed to drive a V-belt 45 which drives a pulley 46 mounted on a shaft 47 which drives the sprocket 48 which in turn drives a chain 49 which extends around an additional sprocket 50 on the axle 12. Through this transmission the vehicle is propelled without the use of complicated and expensive transmission, and other mechanism.

The unit for sustaining both the load and the operator comprises a wheel supported frame and body pivotally connected to the frame of the driving and steering unit in sufficiently close proximity to the steering wheel to enable a rider to steer the vehicle.

The frame is composed of a substantially U-shaped frame member having a central portion 51 having sides or legs 52 and a pair of inwardly spaced framed members 53, braces 54 being provided for firmly joining the members 52 and 53. The frame members 52 and 53 are supported by an axle 55 and wheels 56 and such frame members in turn support a body including side members 57 and 58, a floor 59, a seat 60 and a partition 61 which forms the front end of the load carrying compartment and a back rest for the operator. A brace 62 also may be employed for bracing the floor upon the frame member 51.

In order to connect the driving and steering unit and the unit for sustaining both the load and the operator a pair of pivot arms 63 may be attached, one toward each side of the vehicle to the member 51 and connected by a pivot 64 with the frame member 10 so that the two units may pivot relative to each other. In order to cushion the connection between these members and to keep the machine from buckling at the joint when empty, the members 10 and 51 may have right angular opposed projections 65 and 66 with cushioning springs, the bottoms of which may be maintained in place in any desired manner, as, for example, by means of bosses 68 and 69. The opposed members 65 and 66 are located in upright position, although they can be mounted otherwise if desired. As illustrated in Figs. 1 and 3 of the drawings, stops 70 are mounted upon the opposed legs of the frame member 10 and may be employed to limit upward movement of the pivot 64. The shaft 47 is allowed to swing about the axle 12 subject to the tension of spring 71 mounted on the rod 72, such spring 71 yielding upon the application of greater pressure from the sheave through the belt 45.

A cowling may be provided over the engine and the front framework. A bellcrank is used to control the variable clutch arrangement. The flexible cable 39 is connected between the bellcrank 40 and the lever 37 of the clutch and the flexible cable rides over two pulleys or sheaves 74.

It will be apparent from the foregoing that a relatively simple, inexpensive and practical vehicle is provided, the uses of which are varied and numerous.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

In a utility vehicle, a forward and rear U-shaped frame disposed in a common direction and in end-to-end relation, said rear frame including a forward transverse central portion including forwardly directed spaced pivot arms, aligned transverse pivots connecting opposite terminal ends of side portions of said forward frame to said pivot arms, vertically extending, spaced and opposed projections on the respective frames, spring means extending between said projections and cushioning relative pivotal movement between said frames about said transverse pivots, and a stop extending laterally from said forward frame and overlying a portion of one of said pivot arms to prevent buckling of said frames at said pivots.

References Cited in the file of this patent

UNITED STATES PATENTS

| | | |
|---|---|---|
| 860,251 | Schmoele | July 16, 1907 |
| 1,205,526 | Gordon | Nov. 21, 1916 |
| 1,564,740 | Winn | Dec. 8, 1925 |
| 2,306,042 | Custer | Dec. 22, 1942 |
| 2,450,566 | Schmid | Oct. 5, 1948 |
| 2,468,801 | Beall | May 3, 1949 |
| 2,613,753 | Stuebing | Oct. 14, 1952 |
| 2,618,396 | Belt | Nov. 18, 1952 |